Figure 1:
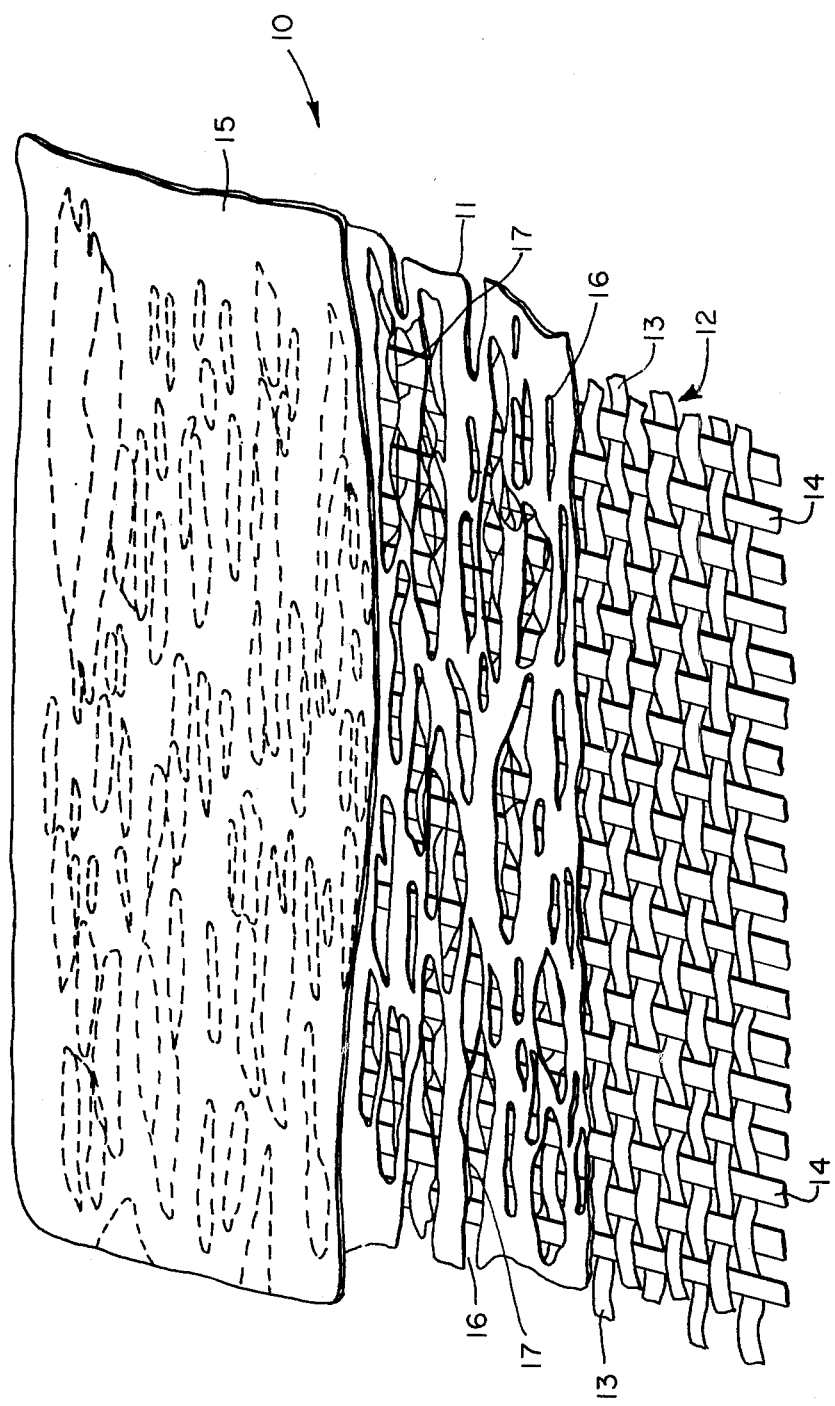

United States Patent [19]

Pattenden

[11] 4,264,659
[45] Apr. 28, 1981

[54] STIFF WOVEN POLYETHYLENE FABRIC COMPRISING LAYERS BONDED TOGETHER BY AN ADHESIVE LAYER CONSISTING OF A THERMOPLASTIC MATERIAL IN THE FORM OF A LACE

[75] Inventor: Thomas W. E. Pattenden, Mississauga, Canada

[73] Assignee: E. I. Du Pont de Nemours and Company, Wilmington, Del.

[21] Appl. No.: 98,974

[22] Filed: Nov. 30, 1979

[30] Foreign Application Priority Data

Dec. 8, 1978 [GB] United Kingdom ............... 47694/78

[51] Int. Cl.³ .................. B32B 5/18; B32B 5/20; B32B 5/24; B65D 79/02
[52] U.S. Cl. .................................... 428/35; 139/389; 156/78; 156/244.25; 206/524.2; 229/53; 428/138; 428/141; 428/196; 428/226; 428/252; 428/265; 428/315; 428/516; 264/DIG. 8
[58] Field of Search ............... 428/35, 138, 141, 196, 428/226, 252, 265, 315, 516; 139/389; 156/78, 244.25; 206/524.2; 229/53; 264/DIG. 8

[56] References Cited

U.S. PATENT DOCUMENTS

| | | | |
|---|---|---|---|
| 2,281,635 | 5/1942 | Strauss | 428/226 |
| 3,300,366 | 1/1967 | Krolik | 264/DIG. 47 |
| 3,439,865 | 4/1969 | Port et al. | 428/226 |
| 3,445,055 | 5/1969 | Port et al. | 428/226 |
| 3,454,455 | 7/1969 | Rasmusen | 428/137 |
| 3,551,267 | 12/1970 | Addison | 206/524.2 |
| 3,644,165 | 2/1972 | Chen | 428/138 |
| 3,700,536 | 10/1972 | Bentuelzen | 428/138 |
| 3,734,812 | 5/1973 | Yazawa | 428/196 |
| 3,762,983 | 10/1973 | Osborn | 156/244.25 |

FOREIGN PATENT DOCUMENTS 909726  9/1972  Canada .

Primary Examiner—James C. Cannon

[57] ABSTRACT

A stiff, tear resistant woven polyethylene fabric is disclosed, which comprises a woven structure of monoaxially oriented polyethylene tapes laminated to an oriented polyethylene film with an adhesive synthetic thermoplastic polymer therebetween. The adhesive has a lace structure with a sufficient number of holes and of an average size to provide the fabric having a tear strength in at least one of the transverse and machine directions substantially greater than the tear strength of a similar fabric produced with a continuous homogeneous film of adhesive of the same synthetic thermoplastic polymer and of the same thickness as the adhesive portions of the lace adhesive. The ratio of the area of the holes in the lace structure to the total area of the lace structure is between about 0.4 and 0.85. The fabric is useful for sacks which are filled in automatic packaging operations.

13 Claims, 2 Drawing Figures

STIFF WOVEN POLYETHYLENE FABRIC COMPRISING LAYERS BONDED TOGETHER BY AN ADHESIVE LAYER CONSISTING OF A THERMOPLASTIC MATERIAL IN THE FORM OF A LACE

The present invention relates to a fabric, made from woven polyethylene tapes, which is useful for making industrial sacks.

It is known to make industrial sacks from fabrics of woven polyethylene tapes that have been extrusion coated with a layer of polyethylene. When used in some automatic sack making and filling methods many such commercial fabrics suffer from the disadvantage of being relatively limp. For example in one step in an automatic sack-filling process a filled openmouthed sack is advanced, open mouth upwards, towards a sewing station where the mouth of the sack is sewn closed. In such a sewing step it is desirable that the open mouth of the sack be stiff enough to prevent sagging of the walls of the mouth, which leads to malformation of the sewn mouth or to an incompletely sewn mouth. In the extreme, the problem of an insufficiently stiff sack mouth may lead to jamming of the apparatus used to prepare the mouth for sewing, and/or the sewing apparatus.

Known methods of stiffening the fabric include using thicker tapes, tightening the weave of the tapes, or applying a thicker coating to a woven tape structure. However, these methods tend to make the fabric more expensive.

Another fabric, a polyproplene fabric of woven polypropylene tapes coated with polypropylene does possess sufficient stiffness to be used in some automatic sack-filling methods. A disadvantage of this polypropylene fabric, however, is that seams in the fabric must be joined either by a hot-melt seaming method, which tends to be expensive, or by sewing.

Another technique for providing a stiff fabric is disclosed in my copending patent application, Ser. No. 096,290 filed on Nov. 21, 1979 (corresponding to British Appl. No. 45992/78). That technique comprises laminating an oriented polyethylene film to a polyethylene-coated scrim of woven polyethylene tapes. The polyethylene coating is sandwiched between the oriented film and the scrim and may serve as the bonding agent therebetween. Such a laminated fabric tends to be substantially stiffer than fabrics made from polyethylene tapes of similar weight per area, and may be joined by heat sealing methods similar to that disclosed by R. N. Poole in U.S. Pat. No. 3,951,050 which issued Apr. 20, 1976. Such a laminated fabric tends to be easy to tear, however, and thus is unsuitable for some applications.

A woven polyethylene fabric, which is stiff and has improved tear resistance has now been found.

Accordingly, the present invention provides a fabric comprising a woven structure of monoaxially oriented polyethylene tapes laminated to an oriented polyethylene film with an adhesive synthetic thermoplastic polymer therebetween, said adhesive having a lace structure with a sufficient number of holes therethrough, of an average size that provides a fabric having a tear strength in at least one of the transverse and machine directions substantially greater than the tear strength of a similar fabric produced with a continuous homogeneous film of adhesive of the same synthetic thermoplastic polymer and of the same thickness as the adhesive portions of the lace adhesive, and wherein the ratio of the area of the holes of the lace structure to the total area of the lace structure, is between about 0.4 and 0.85.

The term "total area of lace structure" means the area of the lace structure, including the holes.

In one embodiment the ratio of the area of the holes of the lace structure to the total area of the lace structure is between about 0.6 and 0.8.

In a further embodiment a substantial percentage of the holes in the lace structure have dimensions large enough to extend over the width of at least one warp or weft tape of the woven structure.

In another embodiment the lace structure is made from a polyethylene, having a density between 0.910 and 0.955 g/cm$^3$, containing a blowing agent in a sufficient amount to form the lace structure upon extrusion of the polyethylene.

Any blowing agent compatible with the thermoplastic polymer e.g. polyethylene may be used e.g. gases, volatile liquids, and solids capable of decomposing to form a gas. Examples of suitable blowing agents are $CO_2$, $N_2$, fluorocarbons, zinc carbonate, sodium bicarbonate, hydrated alumina and azodicarbonamide. It will be understood that some blowing agents, while functional, will not be selected because of, for example, their toxic properties, e.g. HCN.

In yet another embodiment the oriented polyethylene film is a monoaxially oriented polyethylene film made from polyethylene having a density between 0.940 and 0.970 g/cm$^3$ and the direction of orientation of the polyethylene film is aligned with the direction of either warp or weft tapes, preferably the warp tapes of the woven structure.

In a further embodiment the oriented polyethylene film is a biaxially oriented film made from polyethylene having a density between 0.940 and 0.970 g/cm$^3$.

In yet another embodiment the oriented polyethylene film is a blown film made from polyethylene having a density between 0.940 and 0.970 g/cm$^3$.

The present invention also provides a sack made from the fabric of the present invention.

The present invention further provides a process, for making a fabric, comprising laminating an oriented polyethylene film to a woven structure made from warp and weft tapes of oriented polyethylene, by extruding therebetween a thin layer of synthetic thermoplastic polymer having the ability to adhere both to the film and the woven structure and containing a blowing agent in an amount sufficient to cause the thin layer to form a lace structure upon extrusion thereof, and controlling the extrusion to such an extent as to provide the lace structure with a sufficient number of holes therethrough of an average size that provides a fabric having a tear strength in at least one of the transverse and machine directions substantially greater than the tear strength of a similar fabric produced with the same synthetic thermoplastic polymer, devoid of a blowing agent extruded to form a thin continuous homogeneous layer of the same thickness as the lace structure.

In a preferred embodiment of the process of the present invention the extrusion of the synthetic thermoplastic polymer is controlled so as to provide the lace structure with a ratio of the area of the holes of the lace structure to the total area of the lace structure between about 0.4 and 0.85, especially between about 0.6 and 0.8.

In a further embodiment the lace structure is made from a polyethylene having a density prior to the addition of the blowing agent between 0.910 and 0.955 g/cm$^3$.

The blowing agent may be selected from gases, volatile liquids, and solids capable of decomposition to form a gas e.g., zinc carbonate, sodium bicarbonate, hydrated alumina and azodicarbonamide. An especially preferred blowing agent is sodium bicarbonate in a concentration in the range of 1.0 to 3.0% by weight of the polyethylene used for extruding the thin layer.

The present invention may be illustrated by reference to the drawings in which

Figure 2:
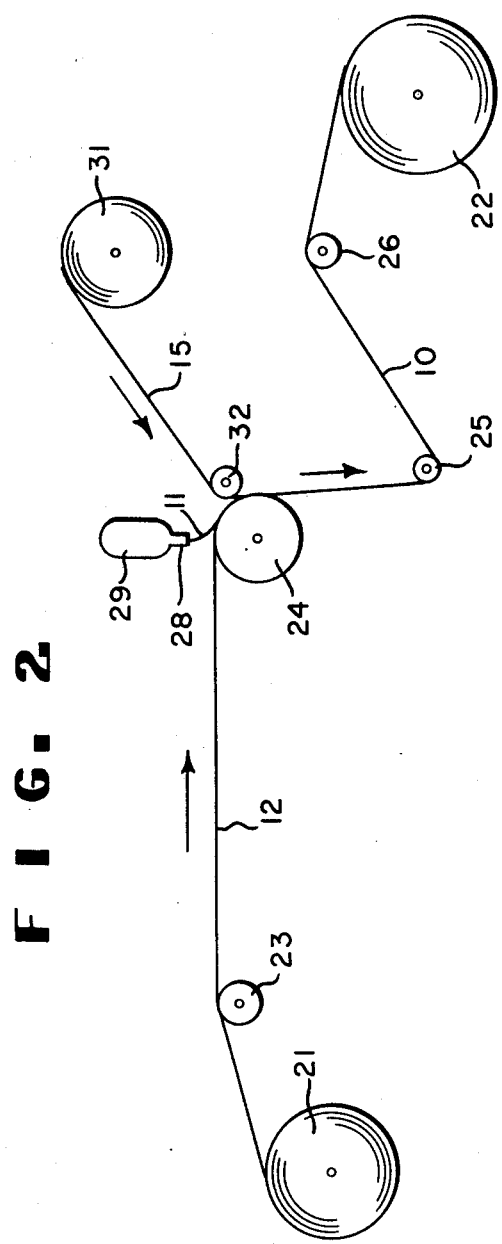

FIG. 1 is a cut-away schematic representation of a fabric of the present invention showing the three layers, and FIG. 2 is a schematic representation of a process of the present invention.

The fabric 10 of FIG. 1 comprises a lace polymeric structure 11 sandwiched between a structure 12 woven from warp tapes 13 and weft tapes 14 of polyethylene, and an oriented polyethylene film 15. It is preferred that the boundaries of holes 16 in the lace structure encompass at least one tape crossover in both the warp and weft directions. For example, it is preferred that a woven structure having a 2.54 mm wide tapes at about four tapes per centimeter in both the warp and weft directions should have holes in the lace structure at least as large as about 2.6 mm in the major and minor axes.

The process of the present invention is shown in FIG. 2 in which a web of woven structure 12, made from woven polyethylene tapes, is transported from supply roll 21 to take up roll 22, passing over idler roll 23, chill roll 24 and idler rolls 25 and 26. A thin layer of polyethylene 11 containing a blowing agent is extruded onto woven structure 12 from slot die 28 of extruder 29, at a position close to or at chill roll 24. Simultaneously, oriented polyethylene film 15 is fed from supply roll 31 and around nip roll 32 onto thin layer 11, thus nipping the three-layer fabric 10 between nip roll 32 and chill roll 24. The chill roll 24 causes thin layer 11 to solidify and adhere to both woven structure 12 and oriented film 15. The thus-laminated fabric 10 is wound up on take-up roll 22.

The size and extent of elongation of the holes in thin layer 11 may be controlled by the temperature of extrusion, the distance between the exit of die 28 and woven structure 12, the relative rates of travel of the woven structure 12 and oriented film 15, and of the thin layer upon emergence from the die, among other factors. The chill roll 24 also serves to "fix" or prevent further expansion of the holes in thin layer 11.

The shape of the holes in the lace structure, when the fabric is made by the process of the present invention tends to be elongated. At higher extrusion temperatures and fast rates of travel of the woven structure and oriented film, the holes may appear somewhat "stringy" i.e., have thin strings of lace material passing across the hole as shown at 17 in FIG. 1.

In the embodiment using monoaxially oriented film as one of the outer layers of the fabric, the film may be conventional monoaxially oriented film or may be co-oriented laminated film. Co-orientation lamination refers to a process involving essentially simultaneous orientation and lamination, and may be accomplished by bringing two polyethylene films into face-to-face contact and orienting the two contacting films longitudinally at a temperature below the melting point of the polymer of the film having the higher melting point. The polyethylene films may be the same, or different, and may be homopolymers or copolymers of ethylene, provided that the homopolymers or copolymers have a density between 0.940 and 0.970 g/cm$^3$.

One method for carrying out the co-orientation lamination involves passing the two contacting films over a first heated roll and subsequently over a second heated roll. The temperature of the first roll is kept higher than that of the second roll, and the surface speed of the second roll is at least 1.5 times the surface speed of the first roll. It is usual for the gap between the first and second rolls to be in the range of 1.2 to 5.0 mm, measured between their surfaces in a line joining the rotational centers of the rolls.

A preferred method for co-orientation lamination in which the two polyethylene films are the same involves taking tubular polyethylene film made by the blown film process, collapsing the film and subsequently co-orientation laminating as hereinbefore described.

The oriented film may also be blown film made from polyethylene having a density in the range of 0.940 to 0.970 g/cm$^3$. Such film may be made by a process such as, for example, that disclosed in Canadian Pat. No. 460 963 which issued Nov. 8, 1949 to E. D. Fuller. The blown film so formed is flattened and slit at the edges, thus forming two sheets, one of which may then be used as the oriented film of the present fabric. The oriented film of this invention is oriented by stretching or blowing the film, preferably, at a stretch ratio of between about 1.1:1 and 7.0:1 or perhaps slightly higher or a blow up ratio of between 1.1:1 and 4.0:1.

The term "stretch ratio" as used herein means the ratio of the length of the oriented film to the length of the film before orientation and the term "blow up ratio" as used herein means the ratio of the diameter of the expanded film tubing to the diameter of the circular die through which the tubing is extruded.

Biaxially oriented film, useful as the oriented film used in the present invention may be made by conventional techniques.

It is preferred that the oriented film and the lace structure have a thickness in the range of 15 to 50 μm, most preferably in the range of 20 to 30 μm.

It is to be understood that the monoaxially oriented polyethylene tapes used to make the scrim portion of the present fabric may be made by first extruding polyethylene film e.g., by the blown film process or the cast flat film process, slitting the film longitudinally to form a plurality of tapes and subsequently orienting the tapes individually in the machine i.e., longitudinal direction. Alternatively, the monoaxially oriented tapes may be made by forming monoaxially oriented film e.g., by co-orientation lamination, and thereafter slitting said film into tapes, as disclosed for example in Canadian Pat. No. 1 041 005 to M. J. Wolstencroft, which issued Oct. 10, 1978. The tapes are then woven into scrim in a known manner.

It is preferred that the polyethylene tapes used in the scrim have a tape width in the range of 1.2 to 6 mm, most preferably in the range of 1.5 to 3.5 mm. It is also preferred that the tapes have a linear density in the range of 550 to 2200 dtex, most preferably in the range of 650 to 1450 dtex.

The preferred synthetic thermoplastic polymer for making the adhesive lace structure is polyethylene, having a density, prior to the addition of the blowing agent, in the range of 0.910 to 0.955 g/cm$^3$.

The blowing agent may be added to the synthetic thermoplastic polymer at the extruder. In the event that the blowing agent is a solid e.g. in powder form, it may be introduced into the throat of the extruder, typically using a weigh belt conveyor to control the rate of addition. In the event that the blowing agent is in liquid or gaseous form, it may be advantageous to introduce the agent directly into the barrel of the extruder.

The present fabric may be made into tubes using a method similar to that disclosed by R. N. Poole in U.S. Pat. No. 3,951,050 which issued Apr. 20, 1976. The tubes are made by folding the fabric longitudinally, bringing the edges together in abutting relationship and applying a joining strip over the abutting edges. Such tubes may then be cut into appropriate lengths and made into open sacks by flattening and closing one end of the tube such as by applying a wide polyethylene strip or strip of polyethylene-coated tape scrim over the end of the tube, using a hot melt adhesive. For sacks made according to this method, it is preferred that, when monoaxially oriented film is used, the direction of orientation of the film is in the direction of the warp tapes. Open sacks made from the fabric of the present invention are suitable for use in automatic packaging operations where stiffness of the mouth of the filled open sack is important for automatically closing the sack mouth.

The fabric of the present invention may have Modified Clark Stiffness values of between 90 and 200, while tear strengths may be between 120 and 250 N.

Modified Clark Stiffness is measured by the Technical Association of Pulp and Paper Industries Standard T-451-m45 with the exception that two samples of fabric are glued in face-to-face contact to overcome the effects of curl. Tear strength is measured by the procedure of ASTM D-2261-71.

The ratio of the area of the holes to the total area of the lace structure may be measured by overlaying a sample of the fabric with a transparent sheet of material marked with a fine grid, and counting the number of squares of the grid overlaying the holes. Once this is known the ratio may be calculated as the number of squares overlaying the holes divided by the number of squares overlaying the sample. If the lace structure is colored, the ratio may be measured automatically using an image analyzer.

The following example serves to illustrate the invention:

Webs of structures woven made from oriented tapes of polyethylene having a density of 0.960 g/cm$^3$ were transported from a supply beam, past an extrusion coater and a chill roll/nip roll assembly, to a windup beam, substantially as shown in FIG. 2 of the drawings. A thin layer of foamable polyethylene was extruded as a coating from a 36 cm wide extrusion coater having a die gap of 0.5 mm, onto the woven structure. The thus-coated woven web travelled a distance of about 13 cm before contacting a 1 m wide, 46 cm diameter chill roll kept at a temperature of about 10° C. A web of co-oriented laminated film was laminated to the coated woven structure by contacting the film and the coated structure at the nip roll which was adapted to nip the three layers between the nip and the chill roll. The processing conditions of each are shown in Table 1 and the measured properties of the laminate so formed are shown in Table 2.

The laminate of Example 2 was made using a non-foamable polyethylene adhesive coating, thus forming a homogeneous film of adhesive coating, for comparative purposes. It will be seen from a comparison of Examples 1 and 2 that the use of a lace structure as the adhesive coating substantially improves the tear resistance of the laminate. The loss of stiffness in the warp direction appears to be the result of elongation of the holes in the warp direction, in the lace structure.

TABLEs 1

| Example | Woven Structure Ends/cm | Picks/cm | Polyethylene Adhesive* | Extrusion Temp. (°C.) | Film** Web |
|---|---|---|---|---|---|
| 1 | 3.55 | 2.28 | A | 610 | P |
| 2 | 3.55 | 2.28 | B | 610 | P |

*A 2% of sodium bicarbonate in a polyethylene having a density of 0.923 g/cm$^3$.
*B A Polyethylene having a density of 0.923 g/cm$^3$ devoid of any blowing agent.
**P 25 μm thick monoaxially co-oriented laminated film made from a polyethylene having a density of 0.960 g/cm$^3$

TABLE 2

| Example | Tear Strength (N) warp | weft directions | Modified Clark Stiffness warp | weft directions |
|---|---|---|---|---|
| 1 | 222.4 | 133.5 | 104 | 163 |
| 2 | 177.9 | 71.2 | 144 | 188 |

I claim:

1. A fabric comprising a woven structure of oriented polyethylene tapes laminated to an oriented polyethylene film, with an adhesive of a synthetic thermoplastic polymer therebetween, said adhesive being a lace structure with a sufficient number of holes therethrough, of an average size that provides a fabric having a tear strength in at least one of the transverse and machine directions substantially greater than the tear strength of a similar fabric produced with a continuous film of adhesive of the same synthetic thermoplastic polymer and of the same thickness as the adhesive portions of the lace adhesive.

2. A fabric according to claim 1 in which the lace structure is made from a polyethylene having a density between 0.910 and 0.955 g/cm$^3$ containing a blowing agent.

3. A fabric according to claim 2 wherein the blowing agent is selected from the group consisting of zinc carbonate, sodium bicarbonate, hydrated alumina and azodicarbonamide.

4. A fabric according to claim 2 wherein the ratio of the area of the holes of the lace structure to the total area of the lace structure is between 0.4 and 0.85.

5. A fabric according to claim 4 wherein said ratio is between 0.6 and 0.8.

6. A fabric according to claim 2 wherein the oriented film is selected from the group consisting of monoaxially oriented film in which the direction of orientation is aligned with the direction of the warp or weft tapes, blown film and biaxially oriented film, said film being made from polyethylene having a density between 0.940 and 0.970 g/cm$^3$.

7. A sack made from the fabric of claims 2, 3 or 6.

8. A process, for making a fabric, comprising laminating an oriented polyethylene film to a woven structure made from warp and weft tapes of monoaxially oriented polyethylene, by extruding therebetween a thin layer of synthetic thermoplastic polymer having the ability to adhere both to the film and the woven structure and containing a blowing agent in an amount sufficient to cause the thin layer to form a lace structure upon extrusion thereof, and controlling the extrusion to such an extent as to provide the lace structure with a sufficient number of holes therethrough of an average size that provides a fabric having a tear strength in at least one of the transverse and machine directions substantially greater than the tear strength of a similar fabric produced with the same synthetic thermoplastic polymer devoid of a blowing agent, extruded to form a thin continuous homogeneous layer of the same thickness as the lace structure.

9. A process according to claim 8 wherein extrusion of the synthetic thermoplastic polymer is controlled so as to provide the lace structure with a ratio of the area of the holes of the lace structure to the total area of the lace structure between about 0.4 and 0.85.

10. A process according to claim 9 wherein said ratio is between about 0.6 and 0.8.

11. A process according to claim 9 wherein the synthetic thermoplastic polymer is polyethylene having a density between 0.910 and 0.955 g/cm$^3$.

12. A process according to claim 9 wherein the blowing agent is selected from the group consisting of zinc carbonate, sodium bicarbonate, hydrated alumina and azodicarbonamide.

13. A process according to claim 12 wherein the blowing agent is sodium bicarbonate in a concentration in the range of 1.0 to 3.0% by weight of the polyethylene used for extruding the thin layer.

* * * * *

UNITED STATES PATENT AND TRADEMARK OFFICE
CERTIFICATE OF CORRECTION

PATENT NO. : 4,264,659
DATED : April 28, 1981
INVENTOR(S) : Thomas W. E. Pattenden It is certified that error appears in the above—identified patent and that said Letters Patent is hereby corrected as shown below:

On the printed face sheet of the patent, the Assignee reading "E. I. Du Pont de Nemours and Company, Wilmington, Del." should read --Du Pont Canada Inc., Montreal, Canada--.

Signed and Sealed this

Twenty-ninth Day of December 1981

[SEAL]

Attest:

Attesting Officer

GERALD J. MOSSINGHOFF

Commissioner of Patents and Trademarks